United States Patent [19]

Dieterich

[11] 4,454,071
[45] Jun. 12, 1984

[54] ISOCYANATOARYL SULPHOCHLORIDES

[75] Inventor: Dieter Dieterich, Leverkusen, Fed. Rep. of Germany

[73] Assignee: Bayer Aktiengesellschaft, Leverkusen, Fed. Rep. of Germany

[21] Appl. No.: 106,229

[22] Filed: Dec. 21, 1979

[30] Foreign Application Priority Data

Dec. 23, 1978 [DE] Fed. Rep. of Germany ....... 2855938

[51] Int. Cl.³ ........................................ C07C 118/04
[52] U.S. Cl. ........................... 260/453 P; 260/453 A; 260/543 H; 260/543 R
[58] Field of Search ........... 260/453 A, 453 P, 543 H, 260/543 R

[56] References Cited

U.S. PATENT DOCUMENTS 3,139,381  6/1964  Novello ......................... 260/543 R

FOREIGN PATENT DOCUMENTS 947159  8/1956  Fed. Rep. of Germany ... 260/453 A
748166  4/1956  United Kingdom ............ 260/453 P

OTHER PUBLICATIONS

Kirk, Encyclopedia of Chem. Tech., vol. 9, p. 466.
Muth, Methoden zur Herstellung und Umwandlung aromat Sulfohalogenide, pp. 563-585.
Rohoff and Rose, Organic Chemistry, MacMillan Company, New York, 1966, p. 393.
March, Advanced Organic Chemistry, McGraw-Hill, New York, 1977, p. 361.

*Primary Examiner*—John M. Ford
*Assistant Examiner*—Robert C. Whittenbaugh
*Attorney, Agent, or Firm*—Gene Harsh; Joseph C. Gil

[57] ABSTRACT

Isocyanatoaryl sulphochlorides corresponding to the following general formula:

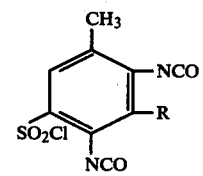

wherein
R represents hydrogen, a sulphochloride group ($SO_2Cl$) or a sulphonic acid group ($SO_3H$), are produced by reacting 2,4-diisocyanatotoluene, optionally as mixtures with up to 35% by weight of 2,6-diisocyanatotoluene, with from 0.2 to 2 mols, per mol of starting diisocyanate, of sulphur trioxide or chlorosulphonic acid and from 0.3 to 20 mols, per mol of starting diisocyanate, of an inorganic acid chloride, either successively or simultaneously, at a temperature of from 0° to 160° C. and hydrogen chloride being removed.

14 Claims, No Drawings

ISOCYANATOARYL SULPHOCHLORIDES

BACKGROUND OF THE INVENTION

Isocyanatoaryl sulphochlorides are known. They are prepared (according to German Pat. No. 947,159) by the phosgenation of aromatic amino sulphonic acids Disadvantages of this process are the need to use high boiling solvents such as dichlorobenzene and, in particular, nitrobenzene, and the relative insolubility of the amino sulphonic acids used as starting materials in these solvents even at the high reaction temperatures used. The reaction, therefore, takes a long time and the yield of isocyanatoaryl sulphochlorides obtained is unsatisfactorily low. This applies particularly to the preparation of diisocyanatoaryl sulphochlorides. One diisocyanatoaryl sulphochloride was obtained in only 46% of the theoretical yield in Example 3 of the above-mentioned patent. Due to these disadvantages, the process has not become commercially important.

It is also known to prepare simple aryl sulphochlorides by the sulphonation of aromatic compounds, e.g. with chlorosulphonic acid or with mixtures of chlorosulphonic acid and sulphuryl chloride (see e.g. Houben-Weyl 4th Edition, Volume 9, pages 563–585). It is also known to prepare sulphochlorides from free sulphonic acids or their salts with acid chlorides. These processes, which are known in the literature, have not been applied or have been applied with only negative results in the preparation of isocyanato sulphochlorides from isocyanates. This is due to a variety of causes.

First, sulphochlorination with chlorosulphonic acid requires an excess of the latter reactant. Thus, the product must be worked up in the presence of water which attacks the isocyanate groups. Secondly, isocyanatosulphonic acids have only become known very recently and have proved to be extremely reactive and very difficult to handle. Thirdly, it is known that sulphonic acid groups undergo uncontrolled and unpredictable reactions with isocyanates at elevated temperatures with the elimination of $CO_2$. Thus, when sulphochloride is prepared under the usual conditions, other reactions must be expected to take place at the same time. Examples of these other reactions are sulphone and anhydride formation and polymerization reactions of the isocyanate group.

Isocyanatoaryl sulphochlorides containing at least two isocyanate groups would be highly interesting substances with a considerable potential for application. In particular, the corresponding derivatives of 2,4-diisocyanatotoluene, which is commercially the most important diisocyanate in polyurethane chemistry, would have considerable potential. The reasons for this interest are (a) these compounds should have a very low vapor pressure compared to unmodified diisocyanate;
(b) these compounds should have a higher polarity than the unmodified diisocyanate; and
(c) their products of hydrolysis (aromatic diamine sulphonic acids) are largely nontoxic.

It was, therefore, an object of the present invention to provide 2,4-diisocyanatotoluene having sulphochloride substituents and an easy commercial process for their preparation.

It was surprisingly found that despite the difficulties to be expected, as mentioned above, this object could be achieved with the process according to the present invention described below. The compounds according to the present invention described below were also found to be valuable starting materials for the preparation of polyisocyanate polyaddition products. They combine not only the advantages mentioned above but also impart improved flame resistance to the polyaddition products prepared from them.

DESCRIPTION OF THE INVENTION

The present invention thus relates to isocyanatoaryl sulphochlorides corresponding to the following general formula:

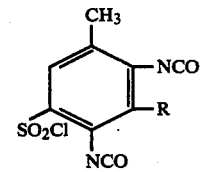

wherein R represents hydrogen, a sulphochloride group ($SO_2Cl$) or a sulphonic acid group ($SO_3H$).

The present invention also relates to a process for the preparation of these new compounds, wherein 2,4-diisocyanatotoluene, optionally as a mixture with up to 35% by weight of 2,6-diisocyanatotoluene, based on the total quantity of diisocyanate used as a starting material, is treated with (a) from 0.2 to 2 mol, per mol of starting diisocyanate, of sulphur trioxide or chlorosulphonic acid and
(b) from 0.3 to 20 mol, per mol of starting diisocyanate, of an inorganic acid chloride, either successively or simultaneously at a temperature of from 0° to 160° C., and hydrogen chloride is then removed from the reaction mixture.

Finally, the present invention relates to the use of the new compounds as starting materials for the preparation of polyisocyanate polyaddition products.

The following are suitable starting materials for the process according to the instant invention:

1. 2,4-diisocyanatotoluene or mixtures thereof with up to 35% by weight, based on the total mixture, of 2,6-diisocyanatotoluene.

2. Sulphur trioxide and/or chlorosulphonic acid. The sulphur trioxide may be used in a liquid, dissolved or gaseous form, e.g. diluted with nitrogen or in the form of an addition compound with organic compounds. Addition compounds of this type include, for example, adducts of sulphur trioxide with dioxane, tetrahydrofuran, diethyl ether or dimethyl formamide. It is preferred to use gaseous sulphur trioxide. Any solvents used for the sulphur trioxide must be inert towards sulphur trioxide as well as towards isocyanate groups under the reaction conditions of the process of the present invention. Suitable solvents include, for example, halogenated or nitrated hydrocarbons, e.g. dichloroethane, tetrachloroethane, methylene chloride, chloroform, fluorotrichloromethane, nitromethane, nitrobenzene, diethyl ether, dioxane, tetrahydrofuran, sulphur dioxide, chlorobenzene, dichlorobenzene or, preferably, excess quantities of the acid chlorides mentioned below in paragraph 3.

3. Inorganic acid chlorides suitable for the conversion of organic sulphonic acid groups into sulphochloride groups, e.g. thionylchloride, sulphurylchloride, phosphorus pentachloride, sulphur chloride or phosgene. Thionylchloride is preferred when carrying out the process of the present invention on a laboratory scale. Phosgene is the preferred compound for use on a commercial scale.

When used in excess, the acid chlorides mentioned under 3 are also the preferred solvents for carrying out the process of the present invention. When phosgene is used, it is preferable to also add one of the inert solvents mentioned above.

The process of the present invention is preferably carried out in the presence of acylated amines, e.g. dimethyl formamide, diethyl formamide, dimethyl acetamide, formyl piperidine, acetyl piperidine or N-methyl pyrrolidone. The preferred catalyst is dimethyl formamide.

The sulphonating agents (2) are generally used in a quantity of from 0.2 mol to 2 mol per mol of diisocyanate (1). It is particularly preferred to use a molar ratio of diisocyanate to sulphur trioxide or chlorosulphonic acid within the range of from 1:0.4 to 1:1.5. When specific diisocyanato-monosulphonic acid chlorides are to be prepared, a molar ratio in the range of from 1:1 to 1:1.2 is generally observed. If the aim is to introduce two sulphochloride groups into one molecule of diisocyanate, a molar ratio within the range of from 1:1.8 to 1:2 is used. An important principle to observe is that the sulphonating agent should be quantitatively used up in the reaction with the diisocyanate or any excess used should be removed so that no excess of sulphonating agent is left after the termination of the sulphonation reaction. Alternatively, one can carry out only partial sulphochlorination of the diisocyanate by using less than the equivalent quantity of the above-mentioned sulphonating agent, for example, using a molar ratio within the range of from 1:0.2 to 1:0.9.

The inorganic acid chloride (3) is used in excess of the sulphonating agent. The molar quantity used is generally from 1.5 to 10 times the calculated molar quantity needed. The molar ratio of diisocyanate to inorganic acid chloride is accordingly within the range of from 1:0.3 to 1:20. If the molar ratio of diisocyanate to sulphur trioxide is approximately 1:1, the molar ratio of diisocyanate to acid chloride used would be between 1:1.5 and 1:8.

The quantity of dimethyl formamide used as a catalyst is generally from about 2 to 40 g per mol of sulphonating agent. A quantity of from 3 to 30 g is preferred. Since, as is well known, isocyanates can react with dimethyl formamide to form unwanted byproducts, the aim is to always use as little dimethyl formamide as possible under the given reaction conditions.

The process according to the present invention is generally carried out at a temperature of from 0° to 160° C., preferably from 5° to 100° C.

The process according to the present invention is particularly suitable for the preparation of 2,4-diisocyanatotoluene-5-sulphochloride and isomeric mixtures thereof containing predominantly 2,4-diisocyanatotoluene-5-sulphochloride and for the preparation of 2,4-diisocyanatotoluene-3,5-disulphochloride and isomeric or homologous mixtures thereof which in addition contain 2,4-diisocyanatotoluene-5-sulphochloride, 2,4-diisocyanatotoluene-5-sulphochloride-3-sulphonic acid and/or mono and disulphochlorides or sulphochloride sulphonic acids which have been obtained by the sulphochlorination of 2,6-diisocyanatotoluene.

The process according to the present invention is particularly suitable for the preparation of monosulphochlorides of diisocyanatotoluene when 2,4-diisocyanatotoluene or a mixture thereof with up to 35% by weight, based on the total mixture, of 2,6 diisocyanatotoluene is treated successively or simultaneously, at from 0° to 160° C., preferably at from 5° to 100° C., with sulphur trioxide or chlorosulphonic acid in a molar ratio in the range of from 1:1 to 1:1.2 and with thionyl chloride or phosgene in a molar ratio of from 1:1.5 to 1:8, and the hydrogen chloride formed in the reaction is removed from the reaction mixture.

There are various possible methods of carrying out the process of the present invention. Some variations for both preparing the particularly preferred 2,4-diisocyanatotoluene-sulphochloride and for preparing the isomers or homologues of 2,4-diisocyanatotoluene-5-sulphochloride are:

(a) A sulphonating agent is first added to the diisocyanate, and subsequently the acid chloride is added. In this variation, the uretdiones of the corresponding isocyanatoaryl sulphonic acids are formed as intermediate products. These are solid, insoluble compounds. In order to keep the reaction mixture stirrable, sulphonation must be carried out either in the presence of one of the inert solvents mentioned above or in the presence of an excess of diisocyanate. If the molar ratio of diisocyanate to sulphonating agent is in the range of from 1:0.7 to 1:2, it is essential to use a solvent. Sulphonation is generally carried out at a temperature of from 0° to 80° C., preferably from 5° to 40° C. The solvent may be partly or completely removed after sulphonation, (e.g. by suction filtration, centrifuging or distillation). Solid isocyanatoaryl sulphonic acids usually go rapidly into solution after addition of the acid chloride in the presence of one of the catalysts mentioned above. When phosgene is used as the acid chloride, the solvent is preferably left in the reaction mixture. When the process is used for the preparation of disulphochlorides, and therefore the molar ratio of diisocyanate to sulphonating agent is approximately 1:2, the diisocyanate may, of course, also be added to a mixture of the solvent and sulphonating agent. It is also possible to sulphonate a previously prepared diisocyanatoaryl monosulphonic acid in an excess of sulphonating agent and to separate the solid reaction product from excess sulphonating agent (for example, by means of an inert solvent) and then mix it with the inorganic acid chloride.

(b) Another variation of the process according to the present invention consists of first mixing the diisocyanate (1) with the inorganic acid chloride and then adding the sulphonating agent. In this case, the acid chloride also serves as a solvent so that no other solvent is needed. Another advantage of this variation of the process is that the diisocyanatosulphonic acid formed as an intermediate product immediately continues to react with the acid chloride, and little or no precipitate forms during the reaction.

(c) The diisocyanate (1) may, of course, also be exposed to the simultaneous action of sulphonating agent and inorganic acid chloride, for example by using a solution of chlorosulphonic acid in thionyl chloride. It is particularly preferred to treat a diisocyanate (1) with phosgene and carry out sulphonation during the phosgenation.

As already described above, the sulphonating agent (2) is generally used in quantities such that the molar ratio of diisocyanate to sulphonating agent is in the range of from 1:0.2 to 1:2. An excess of sulphonating agent beyond the molar ratio of 1:2 may be used if the sulphonating reaction is carried out in a separate reaction step and the excess sulphonating agent is removed after the sulphonating reaction. Since the product of sulphonation is generally a solid precipitating from the liquid reaction medium, removal of the excess sulphonating agent may be carried out, for example by washing with an inert solvent or by distillation. Before addition of the acid chloride, if the process according to the present invention is carried out in two stages or if sulphonation and reaction with the acid chloride are carried out simultaneously, it is necessary to ensure that the molar ratio of diisocyanate to sulphonating agent is never above 1:2.

The reaction with acid chloride (i.e. in the case of a two-stage reaction, the action of acid chloride on the previously formed sulphonic acid, or in a single stage reaction, the action of acid chloride and sulphonating agent on the diisocyanate) is generally carried out at a temperature of from 0° to 160° C., preferably from 10° to 100° C. In a particularly preferred embodiment of the present invention, the sulphonating agent and acid chloride are added at from about 20° to 30° C. and the temperature is then gradually raised to about 80° C. The reaction is continued until no more hydrogen chloride escapes from the reaction mixture. Removal of hydrogen chloride may be accelerated by passing carbon dioxide or nitrogen through the reaction mixture.

When the reaction has been completed, any solvents used and any excess acid chloride are removed by distillation. The liquid residue contains the isocyanatoaryl sulphochloride which is sufficiently pure for most purposes. Where specific sulphochlorides are obtained, in particular 2,4-diisocyanatotoluene-5-sulphochloride or 2,4-diisocyanatotoluene-3,5-disulphochloride, crystallization begins upon cooling of the residue. Further purification can be achieved by recrystallization or by distillation. In order to prevent decomposition reactions during distillation, it is advisable to dissolve the crude product in a small quantity of a polar solvent (e.g.toluene) before distillation, separate the solution in toluene from insoluble constituents, and then, after removal of the toluene by distillation, distill the residue in a high vacuum. It is a special advantage of the instant process that a separate distillation can, in most cases, be avoided.

The residue, which is insoluble in toluene, consists mostly of dimeric diisocyanatoaryl sulphonic acid chloride. Even TDI-sulphochloride which has been highly purified by double distillation contains increasing quantities of dimers after prolonged storage. This is of no importance if the diisocyanatoaryl sulphochlorides are to be used for the preparation of polyaddition products or the preparation of sulphonic acid esters because dimeric uretdiones react substantially like monomeric sulphochlorides.

The following diisocyanatoaryl sulphochlorides have been prepared for the first time by the process of the present invention: 2,4-diisocyanatotoluene-5-sulphochloride; 2,4-diisocyanatotoluene-3,5-sulphochloride; isomeric mixtures of 2,4-diisocyanatotoluene-5-sulphochloride and 2,6-diisocyanatotoluene-5-sulphochloride; corresponding diisocyanatoaryl sulphochlorides containing, in addition, the corresponding dimers (uretdiones).

The finding that the instant process can be carried out to produce high yields at relatively low temperatures is surprising since sulphonation of isocyanates generally leads to very heat stable dimers. Assuming that these dimers are an intermediate stage of the process, both the uretdione ring and the carbamic acid chloride which is formed as an intermediate compound would have to be split again. Only small quantities of by-products are formed apart from hydrogen chloride. One particular advantage of this is that, starting from diisocyanatotoluenes produced on a large industrial scale, the corresponding diisocyanato sulphochlorides can be obtained from them by a simple process. These commercial "TDI-sulphochlorides" which are readily available by the instant process are valuable starting materials for the preparation of polyisocyanate polyaddition products. In particular, polyurethanes prepared from them have improved fire characteristics compared with the corresponding polyurethanes obtained from simple, unmodified polyisocyanates. The isocyanatoaryl sulphonic acid chlorides according to the present invention are also valuable starting materials for the preparation of other modified polyisocyanates, (e.g. the corresponding isocyanatoaryl sulphonic acid esters).

The following Examples serve to illustrate the process of the invention without restricting it in any way. In the Examples, all quantities quoted represent parts by weight or percent by weight, unless otherwise indicated.

EXAMPLES

Example 1

8.5 g of gaseous sulphur trioxide diluted with nitrogen are passed into a solution of 18 g of 2,4-diisocyanatotoluene in 60 ml of 1,2-dichloroethane at 10° C. Most of the dichloroethane is then distilled off. The paste remaining is stirred with 75 g of thionyl chloride and 1 g of dimethyl formamide. The reaction mixture is heated to 80° C. for about one hour, during which time hydrogen chloride escapes. The mixture is kept at a boil until the evolution of hydrogen chloride ceases. Thionyl chloride and dichloroethane are then distilled off under vacuum. The residue (29 g) is stirred with 250 ml of toluene at 70° C. and the solution is filtered from the insoluble residue (7 g). After removal of the toluene by distillation, 21 g of crystalline 2,4-diisocyanatotoluene-5-sulphochloride (mp 73° to 80° C.) are obtained. A very pure product (mp 79° to 82° C.) can be obtained by distillation at from 158° to 160° C. at 0.1 Torr.

Example 2

119 g of crystalline TDI-sulphochloride are similarly obtained from 87 g of commercial tolylene diisocyanate (80% 2,4-, 20% 2,6-isomer), 42 g of sulphur trioxide, 375 g of thionyl chloride and 5 g of dimethyl formamide. Distillation at from 165° to 170° C./0.3 Torr yields 99 g of pure product. Analysis of a twice distilled product (bp 160° to 162° C.) produced the following results:

|    | Calculated for $C_9H_5N_2O_4SCl$ | Found |
|----|----------------------------------|-------|
| C  | 39.6                             | 39.6  |
| H  | 1.8                              | 1.8   |
| N  | 10.3                             | 10.2  |
| O  | 23.5                             | 23.0  |
| Cl | 13.0                             | 13.0  |
| S  | 11.7                             | 11.5  |
|    | 99.9                             | 99.1  |

The IR spectrum and nuclear resonance spectrum confirm the structure. 2,4-diisocyanatotoluene-5-sulphochloride is the main component (about 80%). 2,6-diisocyanatotoluene-5-sulphochloride is the subsidiary component (about 20%).

Example 3

240 ml of thionyl chloride are added to 87 g (0.5 mol) of tolylene diisocyanate (80% 2,4-isomer and 20% 2,6-isomer) and 44 g of sulphur trioxide diluted with nitrogen are introduced into the solution at from 20° to 30° C. Slight precipitation takes place. After the addition of 5 g of dimethyl formamide, the reaction mixture is slowly heated to boiling and the temperature is maintained at 81° C., during which time nitrogen is passed through, until no more hydrogen chloride escapes. After removal of the thionyl chloride by distillation, the product is purified with toluene as described in Example 1. 26 g of a residue which is insoluble in toluene and 108 g of TDI-sulphochloride are obtained.

Example 4

1,740 g (10 mol) of tolylene diisocyanate (80% 2,4-, 20% 2,6-isomer) are sulphonated in 4.5 liters of 1,2-dichloroethane by passing gaseous sulphur trioxide diluted with nitrogen through the solution (consumption: 843 g $SO_3$). Most of the 1,2-dichloroethane is then distilled off until the residue is no longer stirrable. 4.8 liters of thionyl chloride and 100 g of dimethyl formamide are then added and the mixture is heated very slowly to 81° C., during which hydrogen chloride escapes. The solution becomes clear at 65° C. It is boiled, while nitrogen is passed through the solution, until the evolution of hydrogen chloride ceases (81° C.). The product is worked up as described in Example 1. 516 g of residue which is insoluble in toluene (probably mainly a dimer of TDI-sulphochloride) and 2,260 g of crude crystalline sulphochloride are obtained.

Example 5

240 ml of thionyl chloride are added to 87 g (0.5 mol) of tolylene diisocyanate (80% 2,4-, 20% 2,6-isomer) and 58.5 g of chlorosulphonic acid are added dropwise over a 30 minute period. The temperature rises to 35° C. and hydrogen chloride is evolved. 5 g of dimethyl formamide are then added and the product is worked up as described in Example 1. 48 g of residue which is insoluble in toluene and 90 g of crystalline crude TDI-sulphochloride are obtained.

Example 6

The sulphochloride is prepared from 87 g of 2,4-tolylene diisocyanate analogously to Example 5. Yield: 91.5 g.

Example 7

87 g (0.5 mol) of tolylene diisocyanate (80% 2,4-, 20% 2,6-isomer) are sulphonated in 500 ml of 1,2-dichloroethane by the introduction of dilute gaseous sulphur trioxide (45 g of $SO_3$) 7 g of dimethyl formamide are then added and 150 g of phosgene are passed through at 2° C. The reaction mixture is then heated with stirring, and evolution of gas begins at 40° C. The reaction mixture is almost clear at 80° C. A further 120 g of phosgene are introduced at this temperature.

Boiling is then continued, while nitrogen is passed through, until the evolution of hydrogen chloride ceases. The product is worked up as described in Example 1. 111 g of crude crystalline sulphochloride are obtained.

Example 8

174 g (1.0 mol) of 2,4-tolylene diisocyanate are disulphonated in 800 ml of 1,2-dichloroethane by the introduction of 160 g (2.0 mol) of gaseous sulphur trioxide diluted with nitrogen. Most of the dichloroethane is then distilled off. The residue is made up into a slurry with 1,904 g (16 mol) of thionyl chloride and homogenized by heating to 60° C. 25 g of dimethyl formamide are slowly added to the cooled suspension and the mixture is slowly heated. Vigorous evolution of hydrogen chloride begins at 65° C. Boiling is continued until the evolution of hydrogen chloride slows down, and nitrogen is then blown through the reaction mixture. The suspension is then filtered at room temperature (84 g insoluble residue; isocyanate groups and uretdione groups identified in the IR spectrum). The thionyl chloride is distilled from the filtrate in a vacuum. 273 g of a residue melting at from 60° to 70° C. and containing the disulphochloride as its main component and the sulphonic acid sulphochloride of tolylene diisocyanate are obtained.

What is claimed is:

1. A process for the preparation of isocyanatoaryl sulphochlorides comprising reacting 2,4-diisocyanatotoluene, optionally as a mixture of up to 35% by weight of 2,6-diisocyanatotoluene, based on the total quantity of diisocyanate used as a starting material, with
   (a) from 0.2 to 2 mol, per mol of starting diisocyanate, of sulphur trioxide or chlorosulphonic acid and
   (b) from 0.3 to 20 mol, per mol of starting diisocyanate of an inorganic acid chloride,
either successively or simultaneously at a temperature of from 0° to 160° C. and removing hydrogen chloride from the reaction mixture.

2. The process as claimed in claim 1, wherein the inorganic acid chloride is phosgene.

3. A process as claimed in claim 2, wherein a solvent inert to isocyanate groups and sulphur trioxide groups, under the reaction conditions is used.

4. A process as claimed in claim 1, wherein said process is carried out in the presence of acylated amines.

5. A process as claimed in claim 1, wherein the process is carried out in the presence of dimethyl formamide.

6. A process as claimed in claim 1, wherein (a) from 0.4 to 1.5 mol, per mol of starting diisocyanate, of sulphur trioxide or chlorosulphonic acid and (b) from 1.5 to 8 mol, per mol of starting diisocyanate, of an inorganic acid chloride are used.

7. A process as claimed in claim 6, wherein component (a) is from 1:1.8 to 1:2 mol, per mol of starting diisocyanate, of sulphur trioxide or chlorosulphonic acid.

8. A process as claimed in claims 1 or 6, wherein the temperature is from 5° to 100° C.

9. A process for the preparation of isocyanatoaryl sulphochlorides comprising reacting 2,4-diisocyanatotoluene, optionally as a mixture with up to 35% by weight of 2,6-diisocyanatotoluene based on the total quantity of diisocyanate used as a starting material with
   (a) from 0.2 to 2 mol, per mol of starting diisocyanate, of sulphur trioxide or chlorosulphonic acid and (b) from 0.3 to 20 mol, per mol of starting diisocyanate, of an inorganic acid chloride, (c) catalytic quantities of an acylated amine, either successively or simultaneously at a temperature of from 0° to 160° C., and removing hydrogen chloride from the reaction mixture.

10. A process as claimed in claim 9, wherein component (c) is dimethyl formamide at from 2 to 40 g per mol of sulphonating agent.

11. A process as claimed in claim 9, wherein component (c) is dimethyl formamide at from 3 to 30 g per mol of sulphonating agent.

12. A process as claimed in claims 1 or 6 or 9, wherein a sulphonating agent is first added to said diisocyanate and subsequently said acid chloride is added.

13. A process as claimed in claims 1 or 6 or 9, wherein said diisocyanate is first mixed with said inorganic acid chloride and subsequently reacted with said sulphonating agent.

14. A process as claimed in claims 1 or 6 or 9, wherein said diisocyanate and said sulphonating agent and said inorganic acid chloride are reacted simultaneously.

* * * * *